United States Patent
Mills

(10) Patent No.: US 7,289,816 B2
(45) Date of Patent: Oct. 30, 2007

(54) USSD-FACILITATED CALL SETUP FOR PUSH TO TALK OVER CELLULAR (POC) SERVICES

(75) Inventor: James L. Mills, Frisco, TX (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 298 days.

(21) Appl. No.: 10/998,340

(22) Filed: Nov. 23, 2004

(65) Prior Publication Data

US 2006/0111134 A1    May 25, 2006

(51) Int. Cl.
*H04Q 7/20* (2006.01)
*H04B 7/00* (2006.01)
*H04L 12/66* (2006.01)

(52) U.S. Cl. ............... 455/458; 455/459; 455/518; 455/519; 455/517; 455/509; 455/450; 370/352

(58) Field of Classification Search ........ 455/517–519, 455/450–452, 509, 458; 370/352, 401
See application file for complete search history.

(56) References Cited

U.S. PATENT DOCUMENTS

| | | |
|---|---|---|
| 2003/0148779 A1 | 8/2003 | Aravamudan et al. |
| 2004/0121791 A1 | 6/2004 | May et al. |
| 2005/0141471 A1* | 6/2005 | Virtanen et al. ............ 370/342 |

FOREIGN PATENT DOCUMENTS

GB    2 290 196 A    12/1995

OTHER PUBLICATIONS

3GPP TS 23.141, V6.7.0 (Sep. 2004) Technical Specification; 3rd General Partnership Project; Technical Specification Group Services and System Aspects; Presence Service; Architecture and Functional Description (Release 6).
3GPP TR 23.841, V6.0.0 (Jul. 2002 Technical Specification; 3rd General Partnership Project; Technical Specification Group Services and System Aspects; Presence Service; Architecture and Functional Description (Release 6).
ETSI TS 122.141, V5.2.0 (Mar. 2002) Technical Specification; Universal Mobile Telecommunications System (UMTS); Presence Service; Stage 1 (3GPP TS 22.141 Version 5.2.0 Release 5).

* cited by examiner

*Primary Examiner*—Lester G. Kincaid
*Assistant Examiner*—Emem Ekong

(57) ABSTRACT

A method of setting up a Push-To-Talk-over-Cellular (PoC) call between a calling mobile station (MS) and a called MS in a cellular communications network. In GSM/GPRS networks, the method decreases the call setup time, from the time the push-to-talk button is pressed, by causing the called MS to change to READY state before call setup is initiated. This is done by sending a USSD message to the called MS when the calling user selects a PoC contact list on the calling MS. The USSD message causes the called MS to perform a routing area update and change to READY state. This eliminates the need to page the called MS during call setup. In WCDMA networks, the USSD message causes the called MS to reestablish a Radio Resource Control (RRC) connection. The called MS maintains this connection, thereby enabling faster type 2 paging to be utilized for call setup.

2 Claims, 4 Drawing Sheets

USSD-FACILITATED CALL SETUP FOR PUSH TO TALK OVER CELLULAR (POC) SERVICES

BACKGROUND

The present invention relates generally to communication networks, and in particular, to Push-To-Talk-over-Cellular (PoC) services in wireless communication networks.

Push-To-Talk-over-Cellular (PoC) is a fast-connect, half-duplex service alternatively known as Push-to-Talk (PTT) or voice chat services. PTT applications provide two-way, one-to-one private calls and one-to-many group call services similar to a walkie-talkie service, but with a number of advantages. Subscribers can take advantage of private, direct, simultaneous radio voice connection over very wide areas, affordably and conveniently, often replacing other devices such as pagers and two-way radios. Subscribers can instantly connect to one or more receivers simply by pushing a button on their handset. Users receiving the call hear the caller's voice automatically without having to answer the call.

PoC is the official name used in the open specifications currently being developed by the Open Mobile Alliance (OMA) for this service. The PoC specifications utilize a number of existing specifications from the Internet Engineering Task Force (IETF), the Third Generation Partnership Project (3GPP), and 3GPP2 including the capabilities of the 3GPP IP Multimedia Subsystem (IMS) and the 3GPP2 Multimedia Domain (MMD) to enable IP connectivity between mobile devices. Technical specifications describing the PoC feature include the 3GPP TS 22.141 and TS 23.141. Additionally, 3GPP 24.841 specifies the presence methods using the Session Initiation Protocol (SIP). All of these specifications are hereby incorporated herein by reference in their entireties.

In one solution, PoC uses a server, which is independent of the existing radio and core networks. PoC may be implemented on the IP backbone over radio technologies such as WCDMA, CDMA2000, GPRS, UMTS, and 802.11.

The use of IMS and MMD adds the ability to integrate voice and data services over IP-based packet-switched networks. Two fundamental capabilities are added on top of the packet-switched domain. First is the ability to find a user via the Session Initiation Protocol (SIP) to initiate a session. Second is the ability to integrate new services such as PTT. By introducing IMS and its multiple service-delivery capability, a common infrastructure for services is established, and the requirement to build a service delivery infrastructure for each service is eliminated.

A current weakness of the PoC service is that call setup time takes too long, compared to walkie-talkie services. With PoC, the total call setup delay results from several smaller delays, including the necessity (generally) of paging the called MSs prior to forwarding the SIP INVITE message to the MSs. Paging can take up to 1.5 seconds, which, in Global System for Mobile Communications (GSM)/General Packet Radio Service (GPRS) networks, represents approximately ⅓ of the total initial call setup delay. This delay is mainly significant when auto-answer mode is used.

Paging is required because (for GSM/GPRS) the packet-idle MSs drop the radio connections and enter packet mobility management state STANDBY after approximately 45 seconds of inactivity on the packet session. Paging is necessary to reestablish the READY state, and this adds approximately 1.5 seconds to the call setup time. Paging is not necessary if the called MS is already in READY state.

Currently, the standardized method for call setup is SIP signaling over the primary PDP context. This does not reduce the time required for paging the terminal that is in STANDBY mode, so the problem is currently not solved. It has been variously proposed to use "keep-alive" methods, but these methods involve periodically sending "heartbeat" signals to maintain the READY state, but this adds a prohibitive amount of signaling, ties up radio resources, and causes unnecessary power consumption in the MS.

In existing call setup, each MS having a PoC client initially registers with a PoC server using SIP signaling. Next, the MS registers with a presence server utilizing a SIP PUBLISH message to indicate that the MS is available. Periodically the MS re-registers with the presence server (also utilizing the SIP PUBLISH message) to indicate that the MS is still available for PoC services. The MS updates the presence information whenever there is a change. The MS also de-registers at DETACH or power-off.

With some implementations of PoC, the calling user first selects a 'contact' list from the menu on his MS. This list contains the presence/availability status of each listed party. The PoC client in the calling user's MS requests that the presence status be refreshed at the time that the 'contact' list is selected. The PoC client sends a SUBSCRIBE request to the presence server (via the PoC server), and the presence server sends back the stored status of the registered contacts (or group members). When the MS subscribes to a contact list (instead of an individual MS), the SUBSCRIBE request goes first to the Resource List Server (RLS). The RLS propagates the individual SUBSCRIBE requests to the presence server.

This information is used to refresh the 'contact' list presence information. Alternatively, the presence server may automatically push this information to the PoC client whenever a change of status is detected, but this causes more signaling while the updates are only needed when the subscriber is viewing the contact list.

SUMMARY

The present invention is a method of decreasing the call setup time from the time the push-to-talk button is pressed, by eliminating the need to page the called MSs during setup of the call (for GSM/GPRS), or by using the existing Radio Resource Control (RRC) connection to page the called MS (for Wideband Code Division Multiple Access (WCDMA)).

Thus, in one aspect, the present invention is directed to a method of setting up a Push-To-Talk-over-Cellular (PoC) call between a calling mobile station and a called mobile station in a Global System for Mobile Communications (GSM)/General Packet Radio Service (GPRS) cellular communication network. The method includes causing the called mobile station to change to a READY state prior to initiating call setup; and setting up the PoC call without paging the called mobile station.

In another aspect, the method again sets up a PoC call in a GSM/GPRS cellular communication network. The method includes detecting that a calling user has selected a PoC contact list on the calling mobile station; responsive to detecting that the calling user has selected the PoC contact list, sending a presence refresh request message from the calling mobile station to a PoC server; and responsive to receiving the presence refresh request message in the PoC server, sending an Unstructured Supplementary Services Data (USSD) message from the PoC server to the called mobile station. Responsive to receiving the USSD message in the called mobile station, the called mobile station sends a USSD response message to the PoC server; performs a routing area update; and changes the called mobile station to packet mobility management state READY. The method also includes detecting that a calling user has pressed a push-to-talk (PTT) button on the calling mobile station. Responsive to detecting that the calling user has pressed the PTT button, the calling mobile station sends an INVITE message to the called mobile station, wherein an access network serving the called mobile station delivers the INVITE message to the called mobile station without paging the called mobile station. The called mobile station then returns a 200OK message to the calling mobile station, and packet flow is established between the calling mobile station and the called mobile station.

In yet another aspect, the present invention is directed to a method of setting up a PoC call between a calling user equipment (UE) and a called UE in a Wideband Code Division Multiple Access (WCDMA) cellular communications network. The method includes establishing a Radio Resource Control (RRC) connection for the called UE prior to initiation of call setup by the calling UE; maintaining the established RRC connection for a defined time period while waiting for the calling UE to initiate call setup; initiating call setup by the calling UE; and setting up the PoC call utilizing the established RRC connection to page the called UE utilizing type 2 paging.

In another aspect, the method again sets up a PoC call in a WCDMA cellular communication network. The method includes detecting that a calling user has selected a PoC contact list on the calling UE; and responsive to detecting that the calling user has selected the PoC contact list, sending a presence refresh request message from the calling UE to a PoC server. Responsive to receiving the presence refresh request message in the PoC server, an Iu-CS signaling connection is established between a radio network controller and a mobile switching center server serving the called UE; a Radio Resource Control (RRC) connection is established between the radio network controller and the called UE; and a USSD message is sent over the Iu-CS signaling connection and the RRC connection from the PoC server to the called UE. Responsive to receiving the USSD message in the called UE, the called UE sends a USSD response message to the PoC server, and maintains the established RRC connection for a defined time period while waiting for the calling UE to initiate call setup. The method also includes detecting that a calling user has initiated call setup by pressing a PTT button on the calling UE. Responsive to detecting that the calling user has pressed the PTT button, the calling UE sends an INVITE message to the called UE, and an access network serving the called UE delivers the INVITE message to the called UE utilizing type 2 paging. The called UE then returns a 200OK message to the calling UE, and packet flow is established between the calling UE and the called UE.

BRIEF DESCRIPTION OF THE SEVERAL VIEWS OF THE DRAWINGS

In the following, the essential features of the invention will be described in detail by showing preferred embodiments, with reference to the figures of the attached drawings, in which.

DETAILED DESCRIPTION

The present invention decreases the call setup time from the time the push-to-talk button is pressed, by eliminating the need to page the called MSs during setup of the call (for GSM/GPRS), or by using the existing Radio Resource Control (RRC) connection to page the called MS (for WCDMA). The invention accomplishes this in the following manner. Whenever the calling user opens the contact list on his MS, the PoC client in the MS sends a Presence Refresh Request message to the presence server (via the PoC server) to update the status (e.g., READY, STANDBY, IDLE, etc.) of the contacts. The PoC server then sends or forwards Unstructured Supplementary Services Data (USSD) messages to some or all of the registered contacts. In GSM/GPRS networks, the PoC client in each MS receiving a USSD message performs a Routing Area Update (RAU), to cause the MS's packet mobility management state to change to READY. When the calling user subsequently presses his PTT button, the called MSs are already in the READY state, thereby eliminating the need to page the called MSs. In WCDMA networks, the RRC connection may be reestablished and maintained using USSD, and this allows paging type 2 to be performed over the existing RRC connection.

Figure 1:
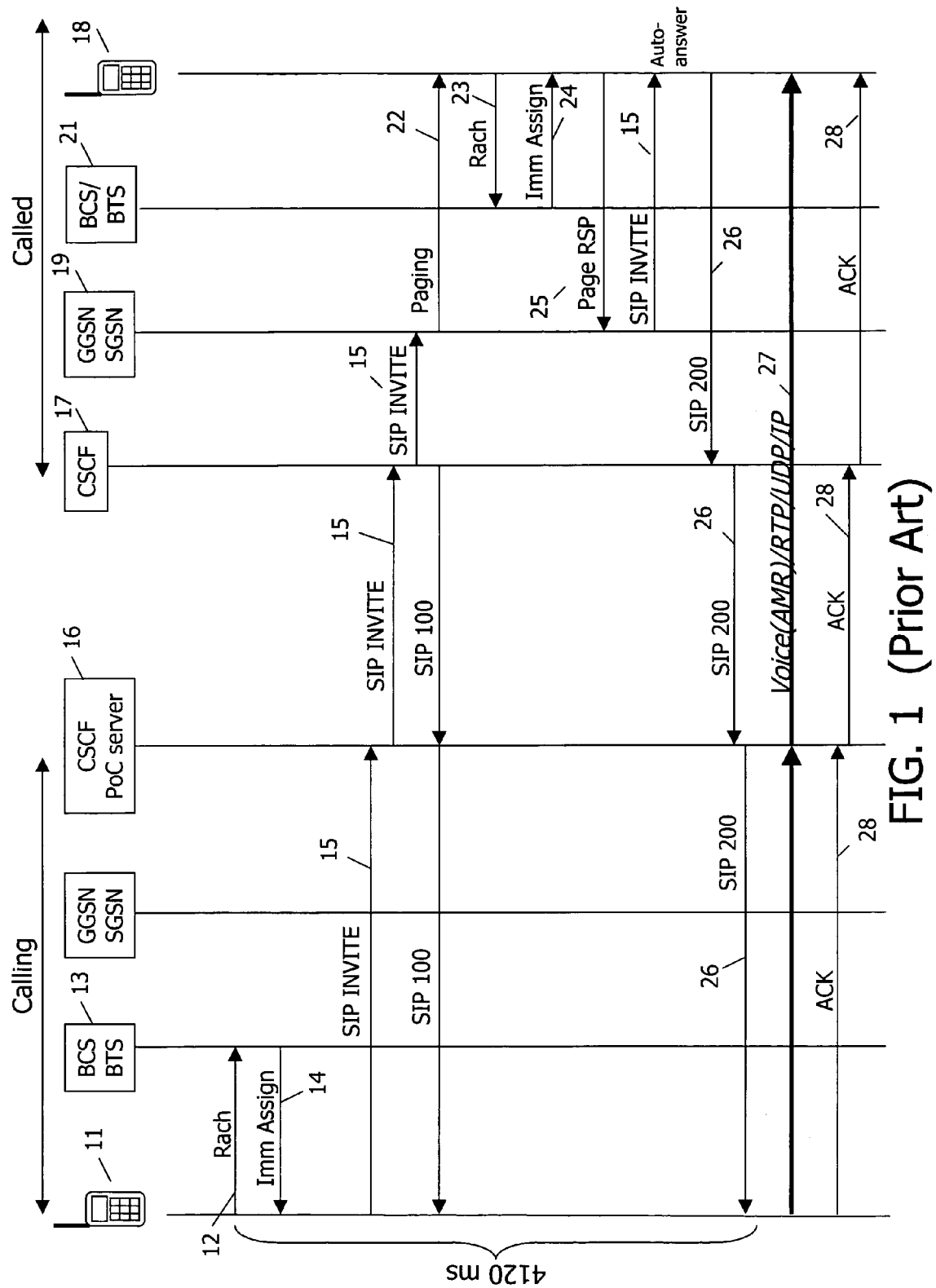
FIG. 1 is a signaling diagram illustrating the messages involved in setting up a PoC call according to existing SIP call setup procedures.

FIG. 1 is a signaling diagram illustrating the messages involved in setting up a PoC call according to existing SIP call setup procedures. When the calling user pushes the PTT button on his MS 11, the calling MS sends a Random Access Channel (RACH) request 12 to a calling Base Station Controller (BSC)/Base Transceiver Station (BTS) 13, and receives a channel assignment message 14 in response. The calling MS then sends a SIP INVITE message 15 to a PoC server 16 and calling Call State Control Function (CSCF). The PoC server forwards the SIP INVITE message to a called CSCF 17 associated with a called MS 18. The called CSCF 17 forwards the SIP INVITE message to a called Gateway GPRS Service Node (GGSN)/Serving GPRS Service Node (SGSN) 19 serving the called MS 18.

The called GGSN/SGSN 19 then causes a called BSC/BTS 21 serving the called MS to page the called MS at 22. In response, the called MS sends a RACH request 23 to the called BSC/BTS, and receives a channel assignment message 24 in response. The called MS then sends a Page Response message 25 to the called GGSN/SGSN 19. The GGSN/SGSN then forwards the SIP INVITE message 15 to the called MS. The called MS then auto-answers the call and sends a SIP 200OK message 26 to the called CSCF 17. The called CSCF 17 forwards the SIP 200OK message to the calling CSCF/PoC Server 16, which forwards the message to the calling MS 11. At 27, VoIP packets then flow from the calling MS to the called MS via the PoC server. The calling MS also returns an Acknowledgment message 28 to the called MS via the PoC server 16 and called CSCF 17. Under normal conditions, the total time from the initial RACH request 17 until the SIP 200OK message 26 is received by the calling MS is approximately 4120 ms.

Table 1 below illustrates the total call setup sequence (with auto-answer) when utilizing standard SIP signaling. The table includes the approximate normal call setup time delays associated with the paging and subsequent downlink Temporary Block Flow (TBF) assignment (for GSM/GPRS).

TABLE 1

| ACTION | APPROX. TIME (ms) |
|---|---|
| Delay of SIP message process in calling MS | 60 |
| Uplink TBF setup (calling side) | 160 |
| Uplink transmission of SIP INVITE (calling side) | 420 |
| SIP INVITE IMS + CN latency | 300 |
| Paging of called MS | 1500 |
| Downlink TBF setup (called side) | 260 |
| Downlink transmission of SIP INVITE (called side) | 280 |
| SIP message processing in called MS | 60 |
| Uplink TBF setup (called side) | 80 |
| Uplink transmission of SIP 200 OK (called side) | 380 |
| SIP 200 OK IMS + CN latency | 100 |
| Downlink TBF setup (calling side) | 260 |
| Downlink transmission of SIP 200 OK (calling side) | 260 |
| TOTAL TIME | 4120 |

It can be seen from Table 1 that the action of paging the called MS takes 1500 ms, and is the largest single factor in the setup time. By eliminating the requirement to page the called MS, the present invention reduces the total setup time from approximately 4120 ms to approximately 2620 ms.

Figure 2:
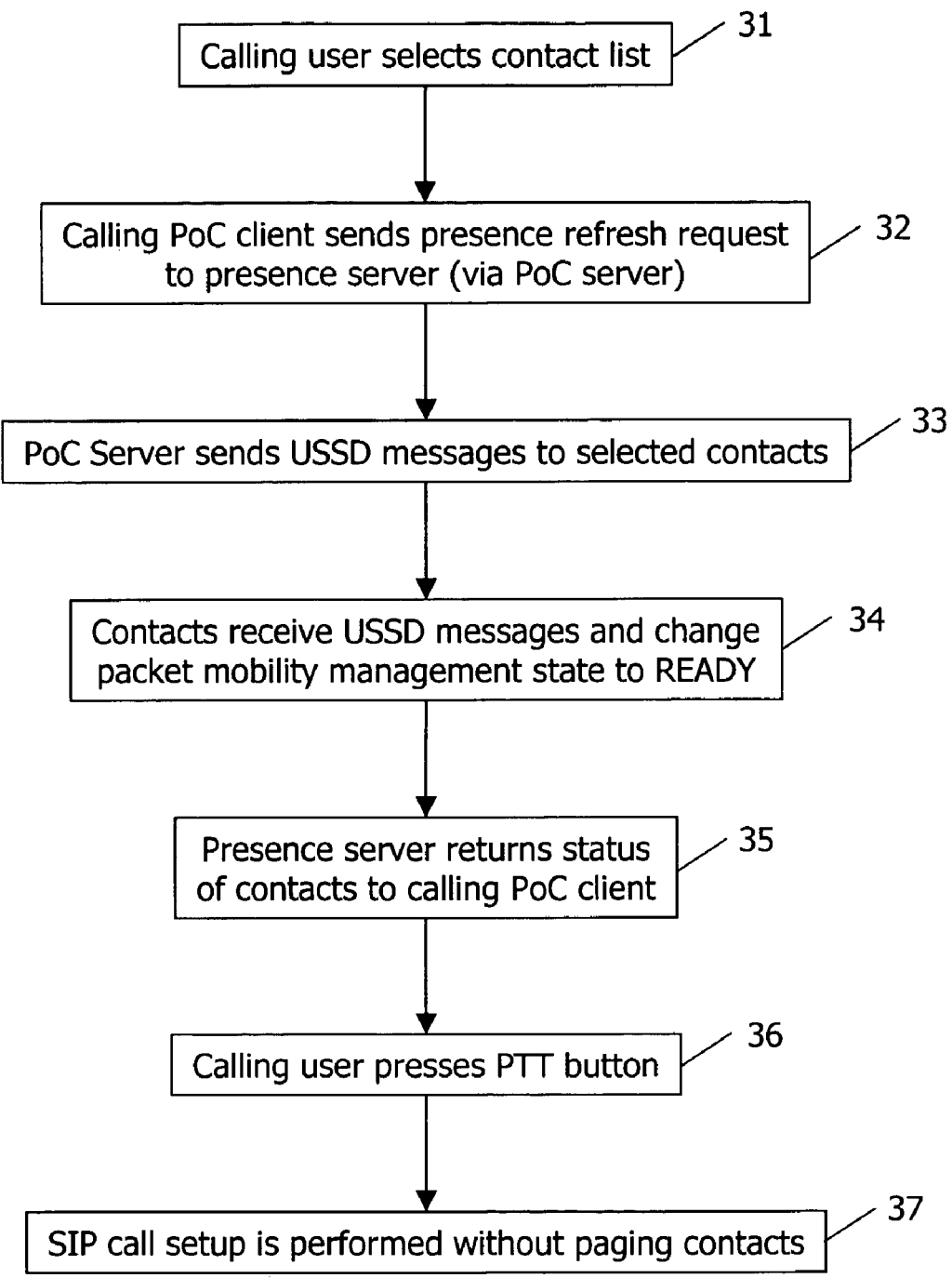
FIG. 2 is a flow chart illustrating the steps of an exemplary embodiment of the method of the present invention when implemented in a GSM/GPRS network.

FIG. 2 is a flow chart illustrating the steps of an exemplary embodiment of the method of the present invention. Prior to beginning the method, the user has subscribed to the PoC service, and has added a number of registered contacts to his contact list. Thus, the PoC server has also stored a list of the user's registered contacts. In addition, the PoC server maintains a PoC call log, and from that log is able to ascertain which contacts are most frequently called or were most recently called.

At step 31, the calling user selects to view the contact list from the menu on his MS. The selection of the contact list is a necessary step in activating the call. This triggers the PoC client in the calling MS to fetch the "presence" information from the presence server by sending a SIP Presence Refresh Request message to the presence server (via the PoC server) at step 32. At step 33, the PoC server recognizes that the Presence Refresh Request message has been sent to the presence server, and the PoC server sends or forwards circuit-switched USSD messages to some or all of the registered contacts. USSD is a circuit-switched service that allows proprietary services to be overlaid on existing mobile networks, with only generic support of the USSD mechanisms in the networks. Because USSD is a circuit-switched service and utilizes dedicated signaling connections between the terminal and network-based applications, USSD is not normally considered for use as a bearer for a packet-switched Voice-over-IP (VoIP) service.

The PoC server may utilize the stored list of the user's registered contacts, the user's PoC call log, and a predefined algorithm to determine which contacts should receive USSD messages. For example, if there are fewer than a predefined number of contacts on the list, the PoC server may send USSD messages to all of the contacts. If there are more than the predefined number of contacts on the list, it may be desirable to limit the number of USSD messages that are sent by sending USSD messages to only a subset of the contact list. For example, the PoC server may send USSD messages to the "x" most frequently called contacts, or the "y" most recently called contacts, according to the predefined algorithm, where x and y are configurable integers, or dynamic numbers based on user behavior and/or subscription type. In addition, the PoC server may utilize terminal capabilities information received in the registration process to ensure that USSD messages are sent only to MSs that support USSD. In order for the PoC server to identify those MSs that can support USSD for this purpose, the initial presence registration by the PoC clients may provide such an indication, together with the called MS's MSISDN to be used by the PoC server when sending USSD messages. The registering client obtains such information from the classmark information. In order for the PoC clients to reply to the PoC server, the PoC server may include its IP address/port information in the USSD message data.

For implementations where the presence data refresh request is not automatically done when the contact list is selected (i.e., presence status is continuously pushed to the clients), then the calling client may alternatively send a USSD message to the PoC server at the time that the contact list is selected. The PoC server then selects registered contacts to receive the USSD message, as described above.

USSD messages from the PoC server to the called PoC clients may optionally go through USSD gateways to the appropriate Home Location Register (HLR), then to the serving Mobile Switching Center (MSC), to the serving Base Station Controller (BSC), and finally to the called client. The called MS's HLRs are provisioned to recognize the external application as a valid sender of USSD messages. USSD application mode is used to address the clients. Selected MSs that do not have an established radio connection must be paged to deliver the USSD message. This paging of potential called parties occurs while the calling user is viewing the contact list. If the USSD is not successfully delivered and acknowledged, then the PoC server defaults to normal handling.

At step 34, a selected MS receives the USSD message. The behavior of the called MS is different, depending upon the type of MS and network operation mode. Therefore, the called MS's PoC client must know the current operating mode of dual-mode terminals (e.g., GSM or WCDMA). A GSM/GPRS type-B MS can monitor both circuit-switched and packet-switched control channels simultaneously, but cannot operate services on circuit-switched and packet-switched domains simultaneously. A Stand-alone Dedicated Control Channel (SDCCH) is required to deliver the USSD message. So when the MS is attached for GPRS operation (STANDBY state), and is paged for circuit-switched dedicated mode, the MS suspends the packet-switched GPRS service. As long as the circuit-switched connection (i.e., the SDCCH) is present, the packet-switched service remains suspended.

The called MS sends a response back to the PoC server. In the response, the PoC client places the IP address/port information in the USSD message data for outgoing messages. The USSD gateway (optional) may extract the address in order to forward the message to the correct PoC server via IP signaling. Alternatively, SPC may be utilized instead of the IP address, in case USSD gateways are not used.

When the called PoC client sends the USSD response, the called MS may perform a RAU or a combined RAU, depending upon the network operation mode (i.e., Gs interface used, etc.). The PoC client must ensure that the RAU is done in this case. Note that the RAU timer will restart, so that the signaling required for the RAU is not entirely an incremental increase in overall signaling. It is preferred that re-authentication not be performed for periodic RAUs. As a result of the RAU, the called MS changes to GPRS READY state. The called MS remains in READY state until the READY timer expires (default 45 seconds). Thus, when the SIP INVITE is received at the SGSN, paging is not necessary in order to forward the INVITE to the terminal.

If the called MS is involved in an ongoing packet-switched session, it will already be in READY state and in packet transfer mode when the USSD message is received at the MSC. In this case, the ongoing packet transfer is interrupted briefly until the USSD response is sent. Then, the RAU would allow the SGSN to continue sending any interrupted packet flow to the MS. The subsequent INVITE message is then received in parallel with the ongoing packet transfer. The USSD message in this case would not have been necessary, but it does not cause any significant problems.

If the called MS is involved in an ongoing circuit-switched speech or data call, then paging is not necessary prior to sending the USSD message to the client. The USSD message would not interfere with the circuit-switched call, and would be transparent to the user. The USSD response message may indicate to the PoC server that the called MS is BUSY with a circuit-switched call. Preferably, the PoC server would not send the SIP INVITE message in this situation. If the SIP INVITE message is sent, it cannot be delivered in this case, and the user cannot participate in the PoC call. In one embodiment, the PoC server delays the INVITE message until the USSD response is received and analyzed. However, if the PoC server had already forwarded the INVITE message when the USSD response was received from the called client, then the SGSN may buffer the INVITE message until the circuit-switched call is completed, and then deliver the message.

In the case of a DTM-capable MS, the operation is the same. This is because DTM allows a circuit-switched call and a packet-switched transfer to occur simultaneously by allocating adjacent timeslots, for example the Packet Data Channel (PDCH) adjacent to the Traffic Channel (TCH).

After the selected contacts have changed to the READY state, the presence server returns the stored status of the contacts to the calling MS at step 35. The calling user can then determine which of the contacts have been selected for receiving the PoC call. At step 36, the calling user presses the PTT button. If the user presses the PTT button within approximately 44 seconds of when the selected contacts changed to READY state, the called MSs will still be in the READY state when the subsequent SIP INVITE message arrives at the SGSN, thereby eliminating the need to page the called MSs. At step 37, the SIP call setup procedures are performed without paging the selected contacts, which are already in READY state.

If the calling user elects not to place the call, then the potentially called MSs return to STANDBY state after approximately 45 seconds, and the users on the contact list are unaware of any change. Additionally, it should be noted that radio resources are not reserved during the 45 seconds.

Figure 3:
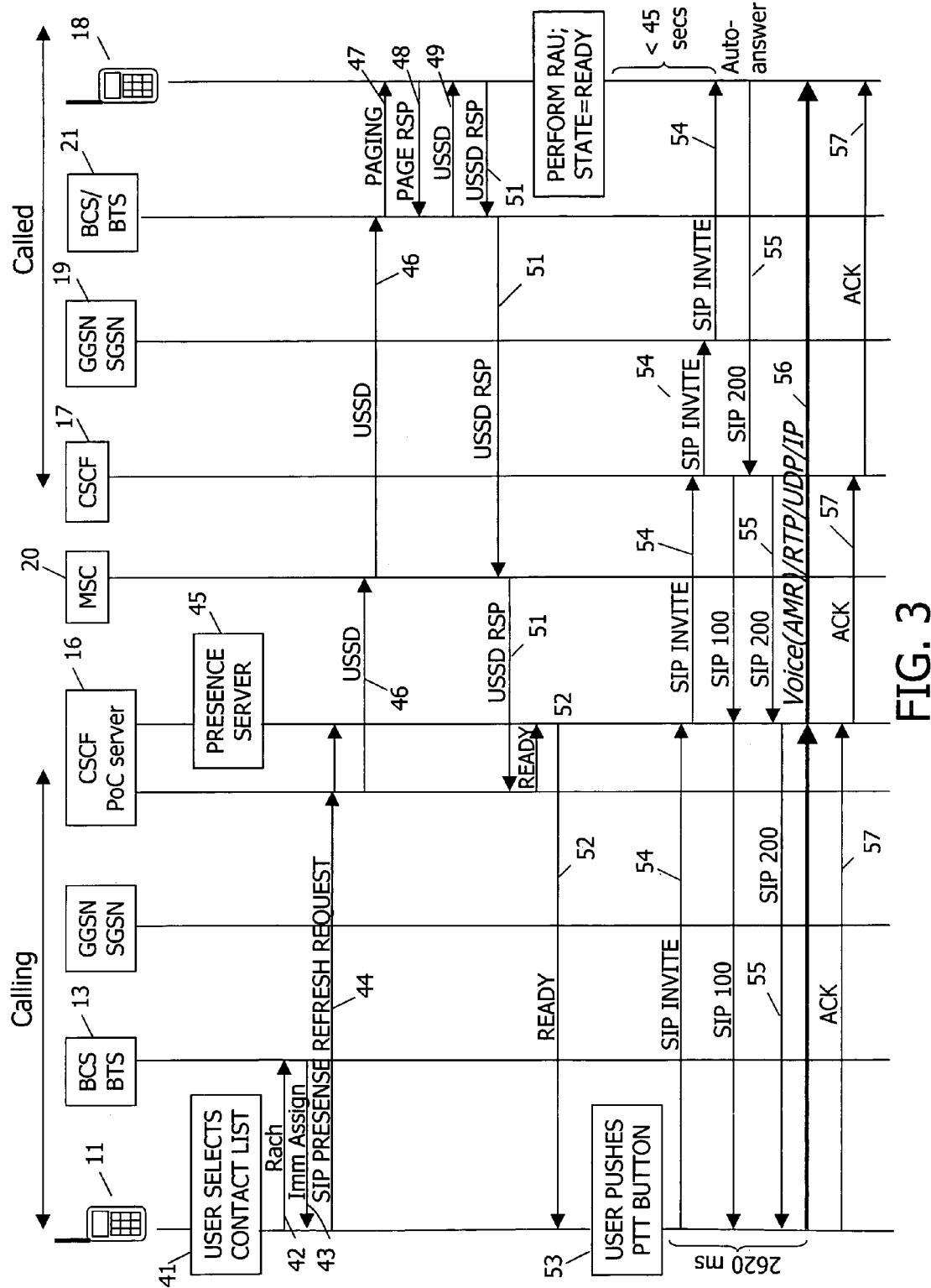
FIG. 3 is a signaling diagram illustrating the messages involved in setting up a PoC call according to the teachings of the present invention.

FIG. 3 is a signaling diagram illustrating the messages involved in setting up a PoC call according to the teachings of the present invention. At 41, the calling user selects to view the contact list from the menu on his MS. The selection of the contact list triggers the calling MS 11 to send a RACH request 42 to the BSC/BTS 13. The BSC/BTS sends a channel assignment message 43 in response. The calling MS then sends a SIP Presence Refresh Request message 44 to a presence server 45 associated with the PoC Server 16. The PoC server recognizes that the Presence Refresh Request message has been sent to the presence server, and the PoC server sends or forwards a circuit-switched USSD message 46 through any required gateway to an MSC 20 serving the called MS 18, which is a registered contact in the calling Ms's contact list. Assuming the called MS does not have a radio connection established, the called BSC/BTS 21 then sends a paging signal 47 to the called MS. The paging signal causes the MS to send a page response 48, and the USSD message is delivered to the called MS at 49.

The called MS 18 then sends a USSD response message 51, which is forwarded back to the PoC server 16 via the MSC 20. The called MS then performs a RAU or a combined RAU, depending upon the network operation mode (i.e., Gs interface used, etc.). As a result of the RAU, the called MS changes to GPRS READY state. The called MS remains in READY state until the READY timer expires (default 45 seconds). Upon receiving the USSD response message 51, the PoC server 16 sends a READY indication 52 to the presence server 45 indicating that the called MS is in READY state. The READY indication is forwarded by the presence server to the calling MS 11 in response to the Presence Refresh Request message 44.

At 53, the calling user subsequently presses his PTT button. Assuming this event occurs within approximately 44 seconds of the time at which the called MS entered READY state, the called MS should still be in READY state when the SIP INVITE message arrives at the called BSC/BTS 21, thereby eliminating the need to page the called MS. Thus, the calling MS 11 sends a SIP INVITE message 54 to the called MS 18 via the PoC server 16, the called CSCF 17, the called GGSN/SGSN 19, and the called BSC/BTS 21. Note that no paging is required because the called MS is already in READY state. The called MS then auto-answers the call and returns a SIP 200OK message 55 to the calling MS 11. At 56, VoIP packets then flow from the calling MS to the called MS via the PoC server. The calling MS also returns an Acknowledgment message 57 to the called MS via the PoC server 16 and CSCF 17. Under normal conditions, the total time from the point at which the calling user pushes the PTT button until the SIP 200OK message 26 is received by the calling MS is 2620 ms.

It should be noted that even if the called MS is in READY state, and therefore does not have to be paged, the MS still goes from non-DRX mode to DRX mode after 2-10 seconds, depending on MS type. A good implementation for the present invention is 10 seconds. After that time, the called MS does not listen to every downlink block, but only once every one-half to one second. This can cause some additional delay, but the delay is still less than the delay caused by having to page the MS.

This potential delay can be reduced or eliminated by introducing a delay from opening the contact list (i.e. from the request for the presence information) to sending the pagings, in order to "hit" the 2-10 second span when the called MS is in non-DRX mode. The delay of "z" seconds, is a fixed configurable integer based on statistical data, or a dynamic number based on user behavior and/or subscription type.

In Wideband Code Division Multiple Access (WCDMA) networks, there is only one radio resource connection per user equipment (UE), shared by both circuit-switched and packet-switched calls. After Packet Data Protocol (PDP) context establishment and registration with the PoC server (and subsequent registration with the presence server), if no PoC call is made, then the traffic on the air interface drops to zero. A down-switch timer (1-10 seconds) then causes the UE to change from CELL_DCH to CELL_FACH, as the initial dedicated transport channels are replaced with common transport channels. An RNC inactivity-timer also starts and subsequently expires (default 30 seconds). This triggers an Iu-release-request message from RNC to the core network. The core network can refuse the request if application-layer connections exist. Normally the core network accepts, so the RRC connection, as well as the Iu-PS signaling connection and Radio Access Bearers (RABs) are released, and the UE enters CELL-PCH state. Thereafter, when the PoC server sends an INVITE message, the UE must be paged (paging type 1), in order to re-establish the RRC connection, and to reactivate the PDP context and bearers.

In the present invention, the USSD connection is maintained for the desired waiting interval, so that paging over the existing RRC connection can be used to deliver the INVITE. If an RRC connection already exists (i.e. for a CS connection), then paging type 2 can be used over the existing RRC connection instead of paging type 1, and this is much faster. The invention establishes an Iu-CS signaling connection between the Radio Network Controller (RNC) and MSC server. The USSD message is then delivered to the called PoC client, and the USSD response is returned to the PoC server. The Iu-CS signaling connection and RRC connection are dropped when the response is returned. Therefore, the called PoC client should delay sending the USSD response for the time interval that it is desired to wait for a possible INVITE message.

In one embodiment, when the called SGSN receives the INVITE message, the SGSN must still page the called UE. However, since the RRC connection already exists, paging type 2 is used over the existing signaling connection. The called UE then reestablishes the Iu-PS signaling connection between RNC and SGSN, and reactivates the PDP contexts, since the SIP signaling for PoC is on the primary PDP context for the session. The bearer for the PDP contexts is also re-allocated. Finally the INVITE message is delivered to the called UE. At this time the PoC client can respond to the USSD message and release the Iu-CS connection.

In an alternative embodiment, the PoC client responds by reactivating the PDP contexts for the PoC call, then releasing the USSD connection. This causes the RAB's to be reallocated and CELL_DCH to be reestablished. The PoC service is then ready to receive the INVITE message until inactivity timers expire again.

In another embodiment, a premium service for PoC is offered in which the dedicated signaling channel is maintained continually. This further reduces the call setup time because the calling UE does not need to seize radio resources first. In this scenario, users with premium service would have the dedicated signaling channel seized at registration, by having the PoC server establish USSD sessions that are maintained while the UE is attached to the network. USSD timers normally limit the overall time-length of USSD sessions, so when the timers periodically interrupt the session, the PoC server reestablishes the sessions. A disadvantage of this approach is that it ties up radio resources that may be IDLE for much of the time. Thus the revenue would have to offset the cost. Additionally, the network should have mechanisms for reverting to the normal mode of operation and releasing the USSD sessions in situations of network congestion or emergency.

Figure 4:
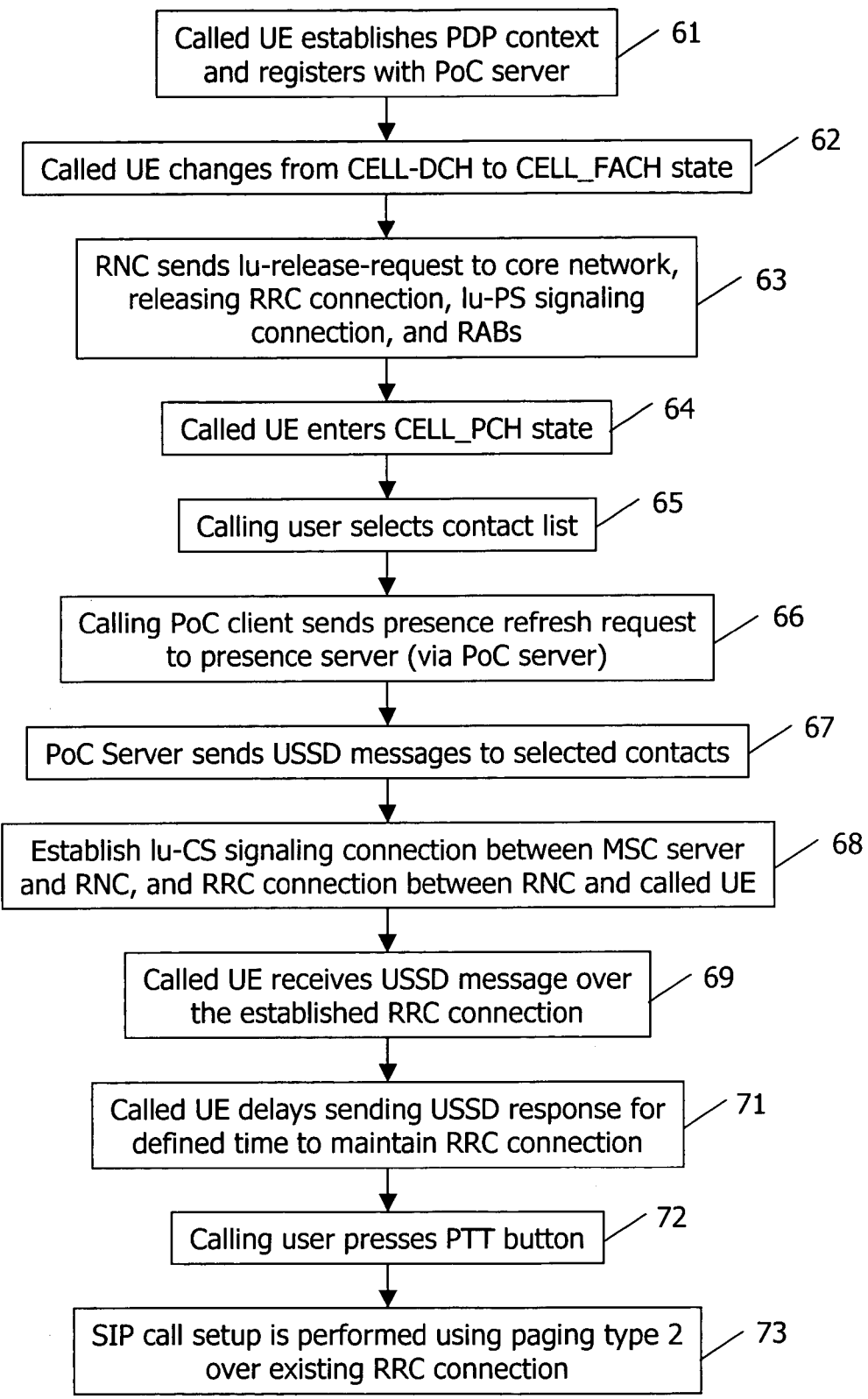
FIG. 4 is a flow chart illustrating the steps of an exemplary embodiment of the method of the present invention when implemented in a WCDMA network.

FIG. 4 is a flow chart illustrating the steps of an exemplary embodiment of the method of the present invention when implemented in a WCDMA network. Steps 61-64 illustrate events in the WCDMA network when the UE, which will eventually receive a PoC call, sets up a PDP context, but no PoC call is received for a period of time. At step 61, the called UE establishes the PDP context and registers with the PoC server. At step 62, the called UE changes from CELL_DCH to CELL_FACH state. At step 63, the RNC sends an Iu-release-request to the core network, thereby releasing the RRC connection, the Iu-PS signaling connection, and RABs. The called UE then enters the CELL_PCH state at 64.

Call setup in accordance with the present invention begins at step 65 where the calling user selects to view the contact list from the menu on his UE. This triggers the PoC client in the calling UE to fetch the "presence" information from the presence server by sending a SIP Presence Refresh Request message to the presence server (via the PoC server) at step 66. At step 67, the PoC server recognizes that the Presence Refresh Request message has been sent to the presence server, and the PoC server sends or forwards circuit-switched USSD messages to some or all of the registered contacts, including the called UE. At step 68, an Iu-CS signaling connection is established between the RNC and the MSC server, and an RRC connection is established between the RNC and the called UE. At step 69, the called UE receives the USSD message over the established RRC connection. At step 71, the called UE then delays sending the USSD response for a defined period of time in order to maintain the RRC connection for a possible INVITE message.

At step 72, the calling user presses the PTT button on the calling UE. Thereafter, at step 73, the SIP call setup procedures are performed using paging type 2 over the existing RRC connection. The setup time is thereby reduced because paging type 2 is faster than paging type 1.

The present invention may of course, be carried out in other specific ways than those set forth herein without departing from the essential characteristics of the invention. The described embodiments are, therefore, to be considered in all respects as illustrative and not restrictive and all changes coming within the meaning and equivalency range of the appended claims are intended to be embraced therein.

What is claimed is:

1. A method of setting up a Push-To-Talk-over-Cellular (PoC) call between a calling mobile station and a called mobile station in a Global System for Mobile Communications (GSM)/General Packet Radio Service (GPRS) cellular communication network, said method comprising:

detecting that a calling user has selected a PoC contact list on the calling mobile station;

responsive to detecting that the calling user has selected the PoC contact list, sending a presence refresh request message from the calling mobile station to a PoC server;

responsive to receiving the presence refresh request message in the PoC server, sending an Unstructured Supplementary Services Data (USSD) message from the PoC server to the called mobile station;

responsive to receiving the USSD message in the called mobile station:

sending a USSD response message to the PoC server;

performing a routing area update; and changing the called mobile station to packet mobility management state READY;

detecting that a calling user has pressed a push-to-talk (PTT) button on the calling mobile station;

responsive to detecting that the calling user has pressed the PTT button, sending an INVITE message from the calling mobile station to the called mobile station, wherein an access network serving the called mobile station delivers the INVITE message to the called mobile station without paging the called mobile station;

returning a 200OK message from the called mobile station to the calling mobile station; and establishing packet flow between the calling mobile station and the called mobile station.

2. A method of setting up a Push-To-Talk-over-Cellular (PoC) call between a calling user equipment (UE) and a called UE in a Wideband Code Division Multiple Access (WCDMA) cellular communication network, said method comprising:

detecting that a calling user has selected a PoC contact list on the calling UE;

responsive to detecting that the calling user has selected the PoC contact list, sending a presence refresh request message from the calling UE to a PoC server;

responsive to receiving the presence refresh request message in the PoC server:

establishing an Iu-CS signaling connection between a radio network controller and a mobile switching center server serving the called UE;

establishing a Radio Resource Control (RRC) connection between the radio network controller and the called UE; and sending an Unstructured Supplementary Services Data (USSD) message over the Iu-CS signaling connection and the RRC connection from the PoC server to the called UE;

responsive to receiving the USSD message in the called UE:

sending a USSD response message to the PoC server; and maintaining the established RRC connection for a defined time period while waiting for the calling UE to initiate call setup;

detecting that a calling user has initiated call setup by pressing a push-to-talk (PTT) button on the calling UE;

responsive to detecting that the calling user has pressed the PTT button, sending an INVITE message from the calling UE to the called UE, wherein an access network serving the called UE delivers the INVITE message to the called UE utilizing type 2 paging;

returning a 200OK message from the called UE to the calling UE; and establishing packet flow between the calling UE and the called UE.

\* \* \* \* \*